United States Patent Office 2,848,462
Patented Aug. 19, 1958

2,848,462

DYESTUFFS OF THE ANTHRAQUINONE SERIES

Ernst Gutzwiller, deceased, late of Basel, Switzerland, by Jenny Gutzwiller-Markees, administratrix, Basel, Switzerland, and Hans Brunner, Basel, Switzerland, assignors, by mesne assignments to Saul & Co., Newark, N. J., as nominee of Fidelity Union Trust Company, executive trustee under Sandoz Trust No Drawing. Application March 30, 1955
Serial No. 498,100

Claims priority, application Switzerland October 31, 1950

8 Claims. (Cl. 260—378)

The present invention is a continuation-in-part of co-pending application Ser. No. 252,804, filed on October 23, 1951 (and abandoned since the filing of the present application for patent), and relates to new anthraquinone derivatives.

A primary object of the invention is the embodiment of anthraquinone dyestuffs of especial utility in the dyeing of fats, oils, benzine and the like as well as lacquers and the like in red shades. This object is realized by the dyestuffs according to the invention, which correspond to the formula wherein each of X and one Y stands for the same radical of the formula $$C_mH_{2m+1}NH-$$

in which $m$ is one of the integers 5 and 8, and the other Y is hydrogen.

These new dyestuffs are obtained by reacting anthraquinone compounds which contain replaceable substituents in the 1- and 5- or in the 1- and 8-positions, with aliphatic amines which contain 5 or 8 carbon atoms.

The object of the invention is also realized by the dyestuff compositions obtained by heating in a solvent medium a mixture of substantially equal parts of an amine of the formula $$C_mH_{2m+1}NH_2$$

in which $m$ is one of the integers 5 and 8, and of an amine of the formula $$C_nH_{2n+1}NH_2$$

in which $n$ is one of the integers 5, 6, 7 and 8, with an aminatable anthraquinone derivative corresponding to the formula wherein each of $a$ and one $b$ is a substituent which is reactable by metathesis with the said amines whereby the said substituents are eliminated and replaced by radicals of the formulae $$C_mH_{2m+1}NH- \text{ and } C_nH_{2n+1}NH-$$

in which $m$ and $n$ have the precedingly-indicated significances, and the other $b$ is hydrogen.

Suitable anthraquinone compounds which contain replaceable substituents in the 1,5- or 1,8-positions comprise inter alia, for example, 1,5- and 1,8-dihydroxy-anthraquinones, 1,5- and 1,8-dimethoxy-anthraquinones, 1,5- and 1,8-dichloro-anthraquinones, 1,5- and 1,8-dibromo-anthraquinones, 1,5- and 1,8-dinitro-anthraquinones, 1,5- and 1,8-nitro-chloro-anthraquinones, the 1,5- and 1,8-nitro-anthraquinone-monsulfonic acids, the 1,5- and 1,8-chloro-anthraquinone-monosulfonic acids, and the 1,5- and 1,8-anthraquinone-disulfonic acids or their salts.

Aliphatic amines, suitable for the preparation of the dyestuffs and dyestuff compositions, comprise, for example, 1-aminopentane, 1-amino-1-methyl-butane, 1-amino-1-methyl-1-methyl-propane, 1-aminooctane and 1-amino-2-ethyl-hexane or mixtures thereof, and, for the preparation of the dyestuff compositions only, the mixtures of these amines with, for example, 1-aminohexane and 1-aminoheptane.

The reaction is preferably carried out in an excess of the aliphatic amine itself or in a solvent, such as water, alcohol, phenol, pyridine or the like, in an open or closed vessel at elevated temperature, preferably in the range between 60 and 150° C., and optionally in the presence of an acid-binding agent, such for example as an alkali metal carbonate or acetate, and of a suitable catalyst, such for example as copper powder and/or a copper salt.

In case an amine is reacted with an alkali metal salt of an anthraquinone-disulfonic acid, according to the present invention, the reaction is preferably carried out in aqueous solution and under raised pressure. In order to avoid side-reactions with the formed sulfite, it is advantageous to add an oxidizing agent such, for example, as potassium bromate, sodium chlorate, potassium chlorate, sodium nitrobenzenesulfonate or the like. In this case, the reaction temperature is preferably between 100 and 150° C.

The obtained dyestuffs are, in general, well crystallized substances of bronzy appearance, which possess in part an outstanding solubility in organic solvents, in fats, oils and benzines, mixtures of the dyestuffs frequently having especially good solubility. They are used for dyeing fats, oils, benzines and the like, as well as for dyeing nitrocellulose lacquers, spirit varnishes, synthetic resin lacquers, etc.

The following examples set forth representative exemplary embodiments of the invention, and these examples are intended to be solely illustrative and not at all limitative. In these examples, the parts and percentages are by weight and the temperatures are expressed in degrees centigrade.

*Example 1*

55.4 parts of 1,5-dichloro-anthraquinone, 13 parts of sodium carbonate and 0.8 part of copper sulfate are stirred for 16 hours at 95–100° C. in 150 parts of 1-aminopentane. At the end of this time, the reaction is ended. The condensation mass is cooled to 20° and stirred into water. The dyestuff is filtered off, washed with water and dried. It corresponds to the formula and dissolves in benzene with orange-red coloration, and in concentrated sulfuric acid with weak yellow coloration, which turns blue upon addition of formaldehyde and after standing for a short time.

The same dyestuff is obtained if, in the preceding paragraph, the 1,5-dichloro-anthraquinone is replaced by an equivalent quantity of 1,5-dibromo-anthraquinone.

If the 1,5-dichloro-anthraquinone is replaced by an equivalent quantity of the 1,8-isomer, a dyestuff is obtained which corresponds to the formula 15 parts of sodium nitrobenzene sulfonate are heated to 140° for 19 hours in 120 parts of water in an autoclave. The resultant crystallized dyestuff is filtered off at 20° C., washed with water and dried. Recrystallized from alcohol, the thus-obtained 1,5-diamylamino-anthraquinone melts at 95–96° C. It dissolves in benzene with orange-red coloration and in concentrated sulfuric acid with weakly yellow coloration; upon addition of formaldehyde and after standing for a short time, the sulfuric acid solution turns blue.

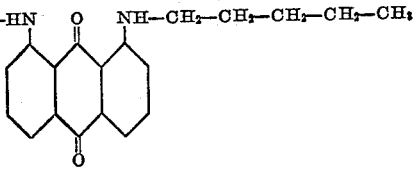

and dissolves in benzene with violet-red coloration, and in sulfuric acid with citron-yellow coloration, which turns green upon addition of formaldehyde. The same dyestuff is obtained, if the 1,8-dichloroanthraquinone is replaced by an equivalent quantity of 1-chloro-8-nitro-anthraquinone.

*Example 2*

20.6 parts of the sodium salt of 1,5-anthraquinone-disulfonic acid, 25 parts of 1-amino-1-methyl-butane and 15 parts of sodium nitrobenzene sulfonate are heated to 140° for 19 hours in 120 parts of water in an autoclave. The thus-produced dyestuff is filtered off, washed with water and dried. It corresponds to the formula

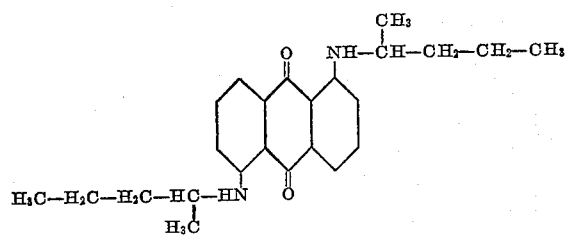

and is a crystalline powder which possesses properties similar to those of the product described in Example 1.

The same dyestuff is obtained if the sodium salt of 1,5-anthraquinone-disulfonic acid is replaced by an equivalent quantity of an alkali metal salt of 1-nitro-anthraquinone-5-sulfonic acid or 1-chloro-anthraquinone-5-sulfonic acid.

As oxidizing agent, the sodium nitrobenzene sulfonate can be replaced by a corresponding quantity of potassium bromate or sodium chlorate or potassium chlorate.

*Example 3*

20.6 parts of the sodium salt of 1,5-anthraquinone-disulfonic acid, 25 parts of technical aminopentane and The dyestuff corresponds to the formula

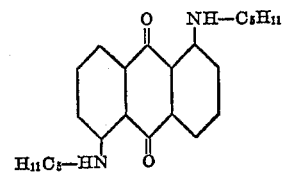

In place of the 1,5-anthraquinone-disulfonate of the preceding paragraph, the 1,8-isomer can also be reacted with technical aminopentane.

The technical aminopentane used according to the present example, is a commercial aminopentane.

*Example 4*

26.8 parts of 1,5-dimethoxy-anthraquinone, 25 parts of a 75% aqueous technical aminopentane solution and 170 parts of 2-butyl alcohol are heated to 100–150° until the reaction is completed. After cooling the contents of the autoclave, the 2-butyl alcohol is distilled off with steam, the formed dyestuff taken up in dilute alcohol, digested, filtered off, washed with water and dried. The dyestuff is identical with that produced according to Example 3, first paragraph.

The same product is obtained when, in place of the 1,5-dimethoxy-anthraquinone, a corresponding quantity of 1,5-dinitro-anthraquinone is reacted with the aminopentane.

*Example 5*

20.6 parts of the sodium salt of 1,5-anthraquinone-disulfonic acid, 25 parts of 1-aminooctane and 15 parts of sodium nitrobenzene sulfonate are heated to 150–155° C. for 19 hours in 120 parts of water in a closed vessel. After cooling to 20°, the dyestuff, which corresponds to the formula

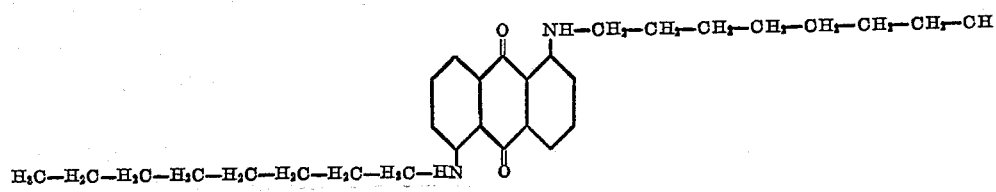

is filtered off, washed with cold water and dried. It is purified by recrystallization from an organic solvent, such as alcohol or benzene. It dissolves in benzine with a red coloration.

*Example 6*

20.6 parts of the sodium salt of 1,8-anthraquinone-disulfonic acid, 25 parts of 1-aminooctane and 15 parts of sodium nitrobenzene sulfonate are heated to 150–155° C. for 19 hours in 120 parts of water in a closed vessel. After cooling to 20°, the dyestuff, which corresponds to the formula The same dyestuff is obtained when the sodium salt of 1,5-anthraquinone-disulfonic acid is replaced by 1,5-dichloro-anthraquinone and this compound is heated with 1-amino-2-ethyl-hexane in the presence of an acid binding agent such as sodium acetate, sodium carbonate and the like, and of a catalyst such as copper powder or a copper salt.

*Example 8*

55.4 parts of 1,8-dichloro-anthraquinone, 150 parts of 1-amino-2-ethyl-hexane, 13 parts of potassium acetate and 0.5 part of copper sulfate are stirred for 16 hours at

is filtered off, washed with cold water and dried. It is purified by recrystallization from an organic solvent, such as alcohol or benzene. It dissolves readily in benzine with red coloration which is somewhat bluish as compared to the color of the solution of the corresponding 1,5-derivative.

*Example 7*

82.4 parts of the sodium salt of 1,5-anthraquinone-disulfonic acid, 62 parts of sodium nitrobenzene sulfonate and 140 parts of 1-amino-2-ethyl-hexane are heated to 145–150° for 24 hours in an autoclave. The thus-produced dyestuff is filtered off, washed with water and dried. It corresponds to the formula 130–140°. At the end of this time the reaction is ended. A test specimen shows no deepening of color in alcohol or benzene. The 1-amino-2-ethyl-hexane in excess is removed from the reaction mass by distillation in vacuo. The residue of the distillation is dissolved in benzine, and the solution is filtered off from insoluble by-products. After that the benzine is distilled off by steam. When cooled a dark crystalline powder separates which, after drying, is soluble in organic solvents such as benzene, acetone, benzine and the like. The solution of the dyestuff in sulfuric acid is yellow; it turns greenish-blue upon addition of formaldehyde.

The same dyestuff is obtained when, instead of 1,8-dichloro-anthraquinone, the sodium salt of 1,8-anthraquinone-disulfonic acid is heated to 140–150°, in aqueous solution and in the presence of an oxidizing agent such as sodium nitrobenzene sulfonate, under raised pressure, with 1-amino-2-ethyl-hexane.

The dyestuff obtained according to both foregoing paragraphs corresponds to the formula

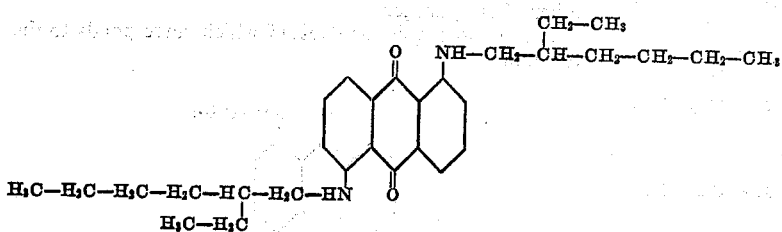

and dissolves in benzene or benzine with orange-red coloration, and in sulfuric acid with yellow-brown coloration, which turns blue upon addition of formaldehyde. It crystallizes from acetone in bronzy yellow crystals, which possess a very good solubility in organic solvents such as benzene, acetone, benzine and the like.

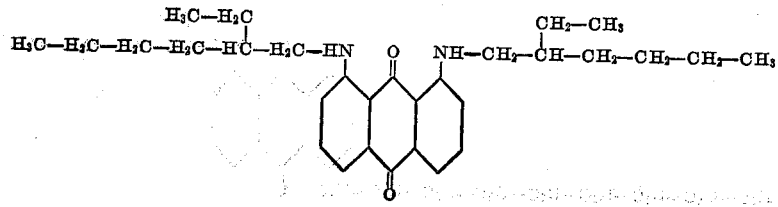

Example 9

20.6 parts of the sodium salt of 1,5-anthraquinone-disulfonic acid, 12.5 parts of 1-amino-1-methyl-butane, 12.5 parts of 1-aminohexane and 15 parts of sodium nitrobenzene sulfonate are heated to 145° for 20 hours in 100 parts of water in an autoclave. After cooling to 20°, the reaction product is filtered off, washed with water and dried. The so-obtained dyestuff is a mixture of the following products:

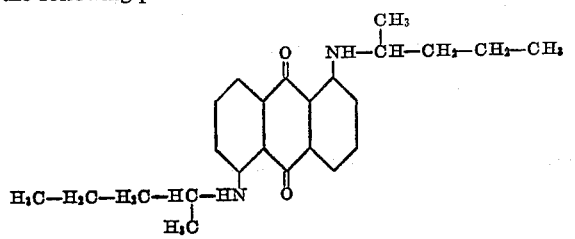

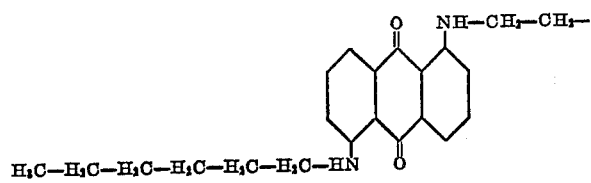

and

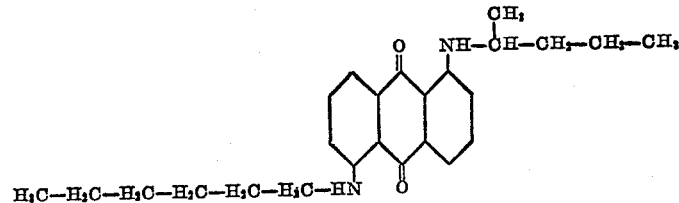

Example 10

20.6 parts of the sodium salt of 1.5-anthraquinone-disulfonic acid, 12.5 parts of 1-amino-1-methyl-butane, 12.5 parts of 1-aminooctane and 15 parts of sodium nitrobenzene sulfonate are heated to 140–145° in 100 parts of water in a closed vessel. Upon completion of the reaction and after cooling the reaction product to 20°, the latter is filtered off, washed with water and dried. The so-obtained dyestuff is a mixture of the following three products:

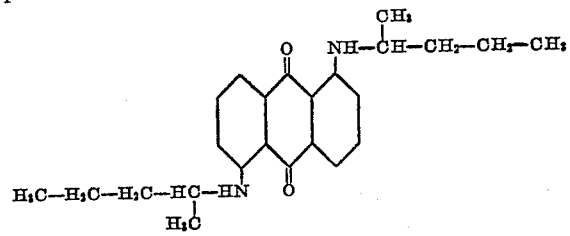

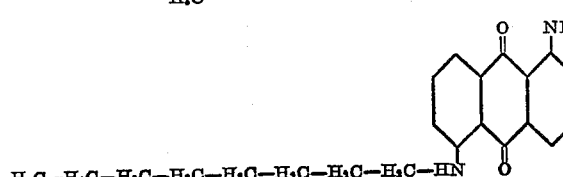

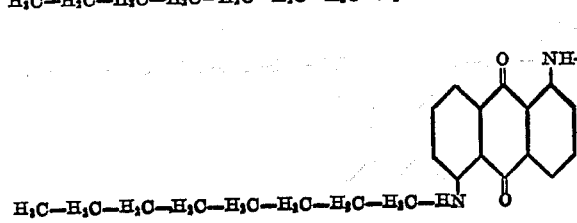

Example 11

0.03 part of the dyestuff produced according to Example 7 is dissolved in 10 parts of a spirit lacquer by heating on a boiling water bath. The solution is filtered and poured onto a substratum, for example a sheet of cardboard. After drying, a dyed film or coating of lacquer is obtained.

Having thus disclosed the invention, what is claimed is:

1. An anthraquinone dyestuff which corresponds to the formula

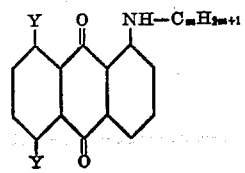

wherein $m$ is one of the integers 5 and 8, one Y stands for a radical of the formula $$C_nH_{2n+1}NH—$$

in which $n$ is one of the integers 5, 6, 7 and 8, and the other Y is hydrogen.

2. An anthraquinone dyestuff which corresponds to the formula

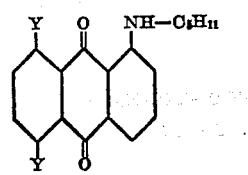

wherein one Y stands for H, and the other Y stands for $C_5H_{11}NH—$.

3. An anthraquinone dyestuff which corresponds to the formula

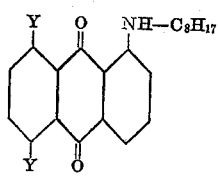

wherein one Y stands for H, and the other Y stands for $C_8H_{17}$ NH—.

4. The anthraquinone dyestuff corresponding to the formula

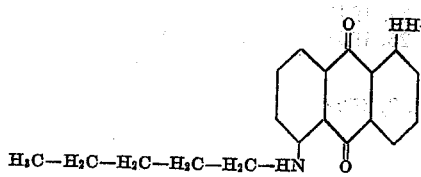

5. The anthraquinone dyestuff corresponding to the formula

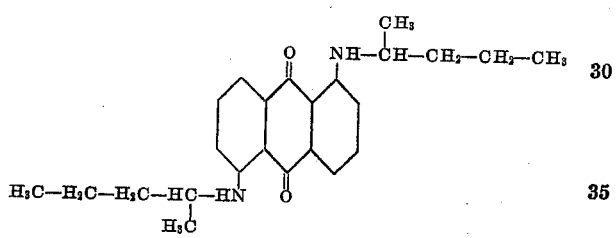

6. The anthraquinone dyestuff corresponding to the formula

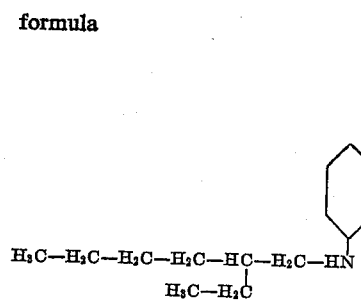

7. The anthraquinone dyestuff corresponding to the formula

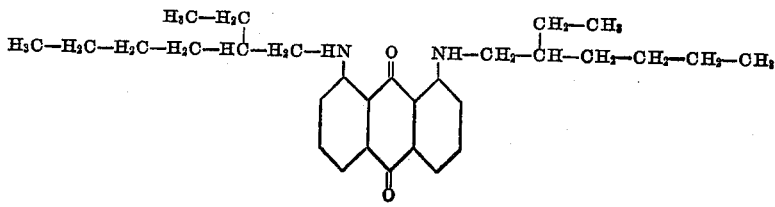

8. The dyestuff product obtained by heating in a solvent medium a mixture of equal parts by weight of 1-amino-1-methyl-butane and 1-aminohexane with an aminatable anthraquinone derivative corresponding to the formula

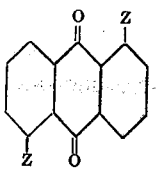

wherein each Z is a substituent which reacts by metathesis

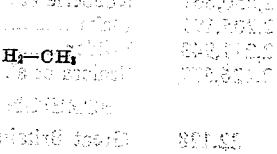

with the said amines whereby the said substituents are eliminated and replaced by residues of the said amines, which product consists of a mixture of

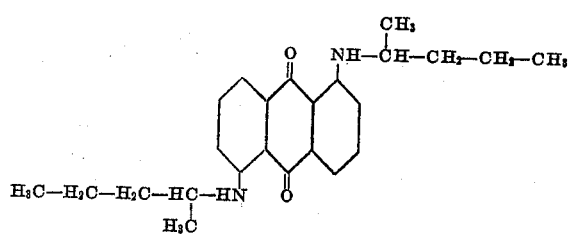

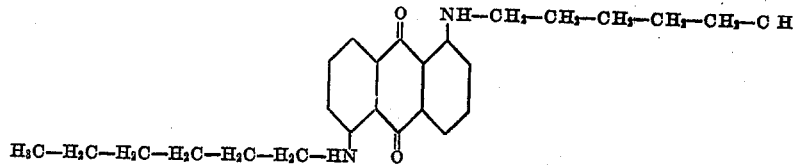

and
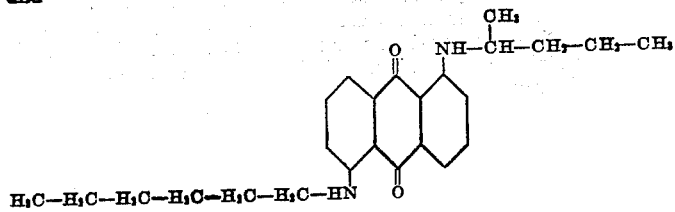
References Cited in the file of this patent
UNITED STATES PATENTS
| | | |
|---|---|---|
| 2,050,661 | Koeberle et al. | Aug. 11, 1936 |
| 2,205,191 | Flaks | June 18, 1940 |
| 2,211,943 | Wilder | Aug. 20, 1940 |
| 2,426,577 | Scalera et al. | Aug. 26, 1947 |
FOREIGN PATENTS
| | | |
|---|---|---|
| 22,128 | Great Britain | Oct. 2, 1902 |

UNITED STATES PATENT OFFICE
Certificate of Correction

August 19, 1958

Patent No. 2,848,462

Ernst Gutzwiller, deceased, by Jenny Gutzwiller-Markees, administratrix

It is hereby certified that error appears in the printed specification of the above numbered patent requiring correction and that the said Letters Patent should read as corrected below.

Column 2, Example 1, the upper right-hand portion of the formula should appear as shown below instead of as in the patent:

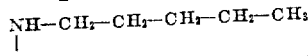

column 4, Example 5, the upper right-hand portion of the formula should appear as shown below instead of as in the patent:

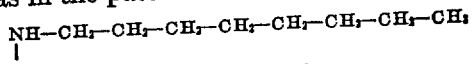

Signed and sealed this 14th day of April 1959.

[SEAL]

Attest:
KARL H. AXLINE,
*Attesting Officer.*

ROBERT C. WATSON,
*Commissioner of Patents.*